US009432230B1

(12) United States Patent
Chang

(10) Patent No.: US 9,432,230 B1
(45) Date of Patent: Aug. 30, 2016

(54) PASSIVE EQUALIZER CAPABLE OF USE IN A RECEIVER

(71) Applicant: FREESCALE SEMICONDUCTOR, INC., Austin, TX (US)

(72) Inventor: Kevin Yi Cheng Chang, Tempe, AZ (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/918,963

(22) Filed: Oct. 21, 2015

(51) Int. Cl.
*H04B 3/14* (2006.01)
*H04L 27/01* (2006.01)

(52) U.S. Cl.
CPC .............. *H04L 27/01* (2013.01); *H04B 3/14* (2013.01)

(58) Field of Classification Search
CPC ............. H04L 25/03; H04L 25/03891; H04L 25/03949; H04L 25/03012; H04L 25/03019; H04L 25/03031; H04L 25/03038; H04L 25/03127; H04B 3/04; H04B 3/06; H04B 3/14; H04B 3/144; H04B 3/148; H04B 10/697; H04B 10/9972
USPC .................................................. 375/229, 230
See application file for complete search history.

(56) References Cited

U.S. PATENT DOCUMENTS

| 7,499,489 B1* | 3/2009 | Ellersick ........... H04L 25/03057 375/229 |
| 7,656,939 B2 | 2/2010 | Gondi et al. |
| 7,671,694 B2 | 3/2010 | Yeung et al. |
| 8,115,566 B2 | 2/2012 | Chou et al. |
| 2001/0048541 A1* | 12/2001 | Ishii ................... H04B 10/2507 398/201 |

OTHER PUBLICATIONS

Parikh et al, "A 32 Gb/s wireline receiver with a low-frequency equalizer, CTLE and 2-tap DFE in 28 nm CMOS", IEEE International Solid-State Circuits Digest of Technical Papers (ISSCC), Feb. 17-21, 2013, pp. 28-29.
Zhuang et al, "Linear Equalization and PVT-Independent DC Wander Compensation for AC-Coupled PCIe 3.0 Receiver Front End", IEEE Transactions on Circuits and Systems II: Express Briefs, May 19, 2011, pp. 289-293, vol. 58, issue 5.
Fang et al, "A 5.2Gbps hypertransport TM integrated AC coupled receiver with DFR DC restore", IEEE Symposium on VLSI Circuits, Jun. 14-16, 2007, pp. 34-35.

* cited by examiner

*Primary Examiner* — Siu Lee

(57) ABSTRACT

A passive equalizer includes a first resistive element coupled between a first input node and a first output node, a first capacitive element, a first variable resistor, and a first inductive element coupled in series between the first input node and the first output node, a first transistor having a first current electrode coupled to the first output node, and a first current source coupled to the first current electrode of the first transistor.

20 Claims, 3 Drawing Sheets

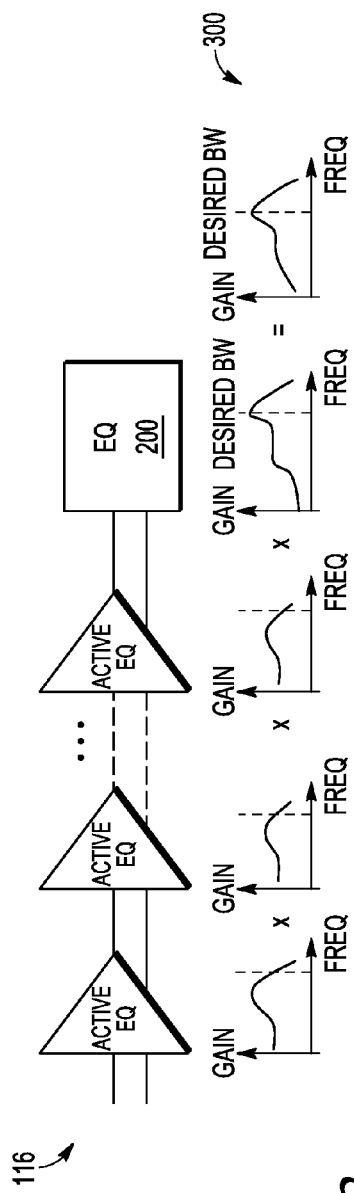
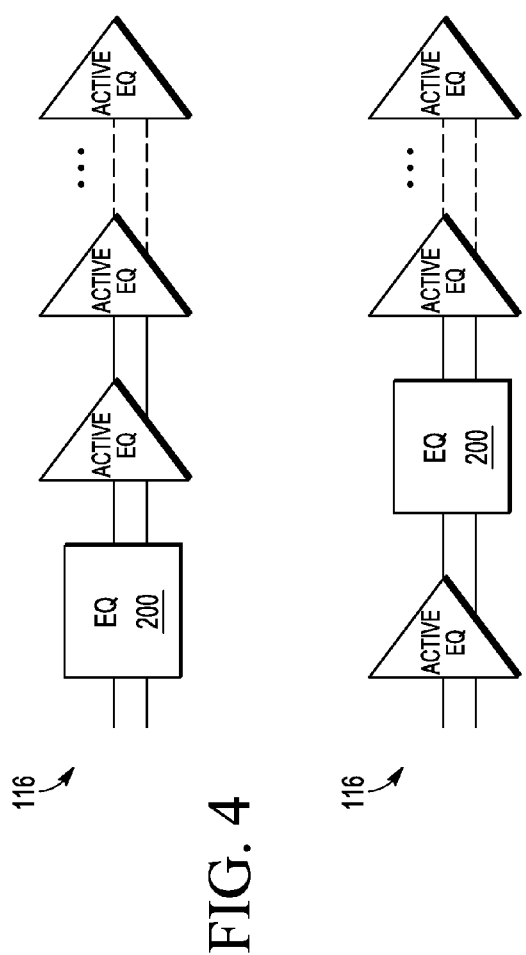
FIG. 3
FIG. 4
FIG. 5

PASSIVE EQUALIZER CAPABLE OF USE IN A RECEIVER

BACKGROUND

1. Field

This disclosure relates generally to equalizers, and more specifically, to a passive equalizer capable of use in a receiver.

2. Related Art

High-speed serial data transmission is used in many different applications. A high-speed serial data transmission system typically includes a transmitter for generating an electrical signal which represents serial data, a channel for transmitting the electrical signal, and a receiver for receiving the transmitted electrical signal and detecting the serial data represented by the electrical signal. In one example, the channel is a trace on a printed circuit board (PCB). Alternatively, it may be a different type of transmission line. Typically, the channel operates like a low-pass filter in which the high frequency portion of the signal is attenuated. This results in distortion the transmitted electrical signal. An equalizer may therefore be used to equalize the overall gain in the overall transmission path for different frequency components in the electrical signals. The equalizer attempts to operate opposite to the channel by boosting the gain at the higher frequencies. While passive equalizers consume less power than active equalizers, passive equalizers available today do not achieve an adequate gain magnitude, acceptable gain-slope, or provide sufficient coverage at low frequencies. Therefore, a need exists for an improved passive equalizer.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIGS. 3-5 illustrate, in block diagram form, different configurations for a set of equalizers, in accordance with embodiments of the present invention.

DETAILED DESCRIPTION

In a high-speed serial transmission system, equalizers may be used in receivers to counter the distortion introduced to electrical signals as they travel from a transmitter through a channel to a receiver. In one embodiment, a passive equalizer includes a pair of negatively-resistive gain boosting circuits and resistor dividers. Since the channel operates similar to a low pass filter, as discussed above, this passive equalizer operates to counter the channel by attenuating the low frequency components and boosting the high frequency components. This equalizer forms a unilateral voltage transfer-function and controls gain-slope as gain-slope varies with process, voltage, and temperature (PVT) variations. Furthermore, this equalizer provides gain-slope control over the lower frequency range as well.

Figure 1:
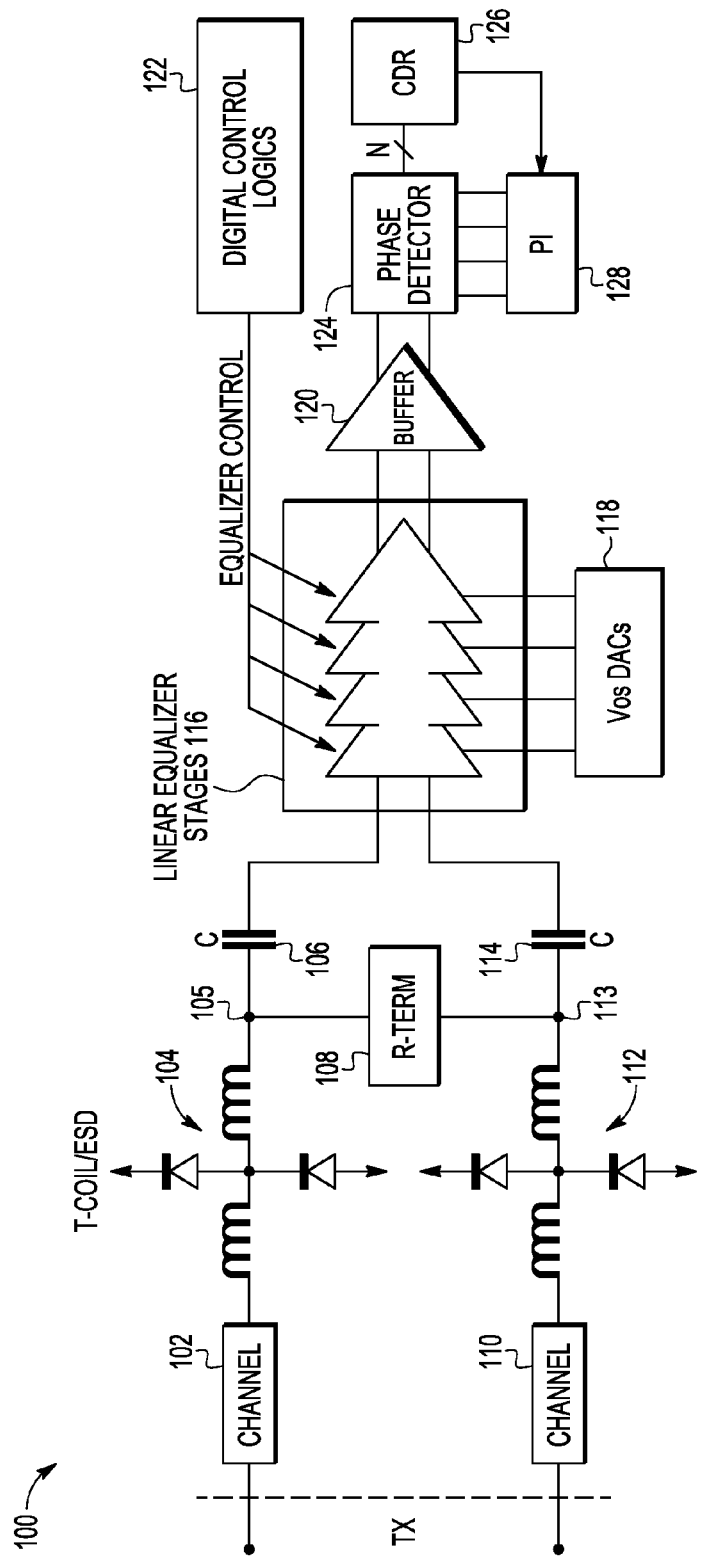
FIG. 1 illustrates, in block diagram form, a data transmission system in accordance with one embodiment of the present invention.

FIG. 1 illustrates, in block diagram form, a receiver 100 which may be used in high-speed serial transmission system, in accordance with one embodiment of the present invention. A transmitter, TX, transmits electrical signals over channels 102 and 110. After channels 102 and 110, the electrical signals go through Bridge-T networks 104 and 112, respectively, each including two mutual inductors which are used for improved impedance matching and reduction of input return-loss. Also included with each Bridge-T networks 104 and 112 are diodes for electrostatic discharge (ESD) protection. After the Bridge-T networks, the signals are transmitted through capacitors 106 and 114, which operate as alternating current (AC) coupling capacitors, to input nodes of linear equalizer stages 116. A resistive terminal network (R-Term) 108 is coupled between a circuit node 105, located between Bridge-T network 104 and capacitor 106, and a circuit node 113, located between Bridge-T network 112 and capacitor 114. R-Term 108 provides a self-calibrated input impedance. For example, it may provide a self-calibrated 100-Ohm differential input impedance.

Linear equalizer stages 116 includes any number of linear equalizers, including one or more active equalizers and a passive linear equalizer 200 (which will be described below in reference to FIG. 2). The equalizer stages receives equalizer controls from digital control logics 122. The equalizer controls operate onto the source-degenerative resistors and capacitors (not shown) of the active equalizer stages and also on the variable resistors of the passive equalizer 200. The control of the active equalizer stages makes an adequate gain ratio of the high frequency gain to the low frequency gain in order to compensate the loss of the signal over different frequency regions. The control of passive equalizer 200 then manipulates the increment of the gain magnitude per unit frequency so that the overall linear equalization gain of linear equalizer stages 116 can be well matched to the desired gain characteristics. The equalizers are also coupled to offset voltage correcting digital-to-analog converters (DACs) 118. The offset voltage correcting DACs provide two DC levels at the differential input ports of each equalizer stage so that the offset voltage present at the final equalizer output can be eliminated. The equalizers operate to counter the channel by attenuating the low frequency components and boosting the high frequency components. The linear equalizer chain of stages 116 therefore improves the signal quality and reduces the jitter of the eye diagram of the transmitted signal through the channel.

The output of linear equalizer stages 116 is provided to a buffer 120. The output of buffer 120 is provided to a phase detector 124 which determines phase differences between the output of buffer 120 and the receiver sampling clocks given by phase interpolator (PI) 128. Phase detector 124 decodes the phase error and provides an N-bit data bus to clock and data recovery (CDR) circuit 126 which provides feedback to PI 128. PI 128 is coupled to phase detectors 124 and is used to generate signal phase shifts in discrete increment steps. PI 128 sends in-phase and quadrature clocks, which are 90 degrees out of phase, to sample the data signal at phase detector 124. When CDR 126 settles to a steady state, the in-phase PI clock will be lined up to the center of the data signal and the quadrature PI clock is present at the transition-edge of the data.

Figure 2:
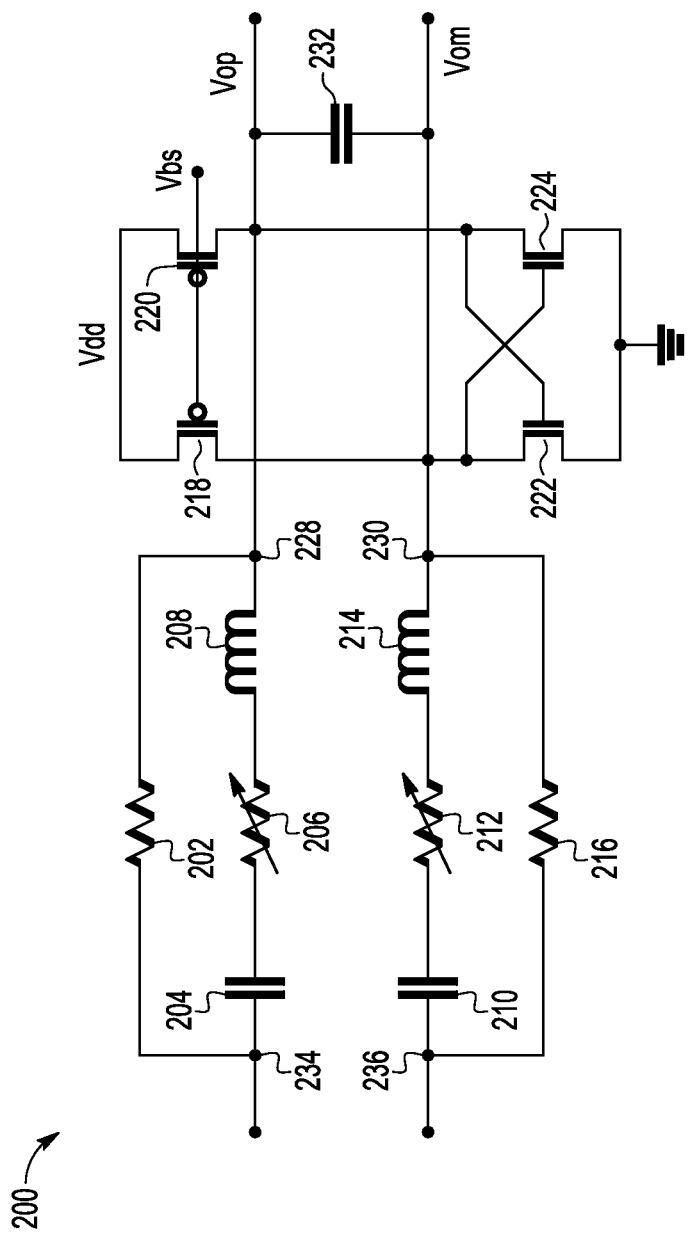
FIG. 2 illustrates, in schematic form, a passive equalizer in accordance with one embodiment of the present invention.

FIG. 2 illustrates a passive equalizer 200 in accordance with one embodiment of the present invention. Equalizer 200 includes capacitors 204, 210, and 232 (also referred to as capacitive elements), resistors 202 and 216 (also referred to as resistive elements), variable resistors 206 and 212 (also referred to as tunable resistors), inductors 208 and 214 (also referred to as inductive elements), p-type transistors 218 and 220, and n-type transistors 222 and 224. A first terminal of resistor 202 is coupled to a circuit input node 234 and a second terminal is coupled to a circuit output node 228, which provides an output voltage Vop. A first terminal of resistor 216 is coupled to a circuit input node 236 and a second terminal is coupled to a circuit output node 230 which provides an output voltage Vom. A first terminal of capacitor 204 is coupled to circuit node 234, and a second terminal of capacitor 204 is coupled to a first terminal of variable resistor 206. A second terminal of variable resistor 206 is coupled to a first terminal of inductor 208, and a second terminal of inductor 208 is coupled to circuit node 228. A first terminal of capacitor 210 is coupled to circuit node 236, and a second terminal of capacitor 210 is coupled to a first terminal of variable resistor 212. A second terminal of variable resistor 212 is coupled to a first terminal of inductor 214, and a second terminal of inductor 214 is coupled to circuit node 230. A first current electrode of transistor 218 and a first current electrode of transistor 220 are coupled to voltage supply node, Vdd. Control electrodes of transistors 218 and 220 are coupled to receive a bias voltage, Vbs. A second current electrode of transistor 218 is coupled to circuit node 230 and a second current electrode of transistors 220 is coupled to circuit node 228. A first current electrode of transistor 222 is coupled to node 230, a second current electrode of transistor 222 is coupled to a voltage supply node, Vss (e.g. ground), and a control electrode of transistor 222 is coupled to circuit node 228. A first current electrode of transistor 224 is coupled to node 228, a second current electrode of transistor 224 is coupled to Vss, and a control electrode of transistor 224 is coupled to circuit node 230. A first terminal of capacitor 232 is coupled to node 228, and a second terminal of capacitor 232 is coupled to node 230.

In operation, a differential signal is received at input nodes 234 and 236, and equalized differential output signals is provided as Vop and Vom at nodes 228 and 230. The outputs of equalizer 200 allow for the peak gain at the desired frequency. Cross-coupled transistors 222 and 224 provide a negatively-resistive boosting circuit and provide part of a resistor divider. Cross-coupled transistors 222 and 224 contribute a negative-resistance to the network and combines with resistors 202 and 216 to provide a DC common-mode voltage. The resistor divider is formed in both the top half and bottom half of equalizer 200. For example, resistor 202 and transistor 224 form a resistor divider which determines the voltage at node 228 (corresponding to Vop). Similarly, resistors 216 and transistor 222 form another resistor divider which determines the voltage at node 230 (corresponding to Vom). Therefore, these resistor dividers provide a DC voltage divider to provide the DC common-mode voltage. This DC common-mode voltage is controlled by Vbs. Each of transistors 218 and 220 provide a current source for transistors 222 and 224, respectively, in which the amount of current is determined by Vbs. Therefore, if Vbs is increased, the current in transistors 222 and 224 increase, thus increasing Vop and Vom for the DC operation. The DC gain is therefore provided by resistors 202 and 216 and transistors 224 and 220 and controlled by Vbs.

The LC circuits (including capacitors 204 and 210, shunt capacitor 232, and inductors 208 and 214) in combination with the cross-coupled transistors provides a gain of greater than 1. That is, capacitor 204, inductor 208, transistor 224, and capacitor 232 operate together along with capacitor 210, inductor 214, transistor 222, and capacitor 232 to provide a gain of greater than 1. Therefore, while passive equalizers typically provide a gain of less than 1, equalizer 200 is capable of providing a gain of greater than 1. Also, note that equalizer 200 provides a unilateral voltage transfer-function in that that the forward transfer function (as seen by input nodes 234 and 236 is different from the reverse transfer function (as seen by output nodes 228 and 230). The unilateral voltage transfer-functions are programmable due to variable resistors 206 and 212. Variable resistors 206 and 212 can be used to tune the gain-slopes of the high frequency gain which in turn controls the overall gain-slope of linear equalizers of a system, such as linear equalizer stages 116 of FIG. 1.

FIGS. 3-5 illustrate, in block diagram form, different configurations for linear equalizer stages 116 in FIG. 1, which utilize equalizer 200. FIG. 3 illustrates a configuration in which linear equalizer stages 116 includes any number (one or more) active equalizer stages with passive equalizer 200 coupled at the end of the active equalizer stages. Example gain vs. frequency graphs are provided below each equalizer to illustrate the variation in gain over various frequencies, with the dotted black line representative of the desired bandwidth (BW) for equalizer stages 116. For each subsequent equalizer stage, the gains are multiplicative in effect (as illustrated by the multiplication symbol "x" between each stage's graph), such that the final result is illustrated in graph 300. Note that the peak gain over the progression through the equalizer stages is shifted to align with the desired BW. Therefore, a higher gain is achieved at the desired frequency. In this manner, the signal at higher frequencies has been boosted while attenuating the lower frequencies.

FIG. 4 illustrates a configuration in which passive equalizer 200 is located at the beginning of the one or more active equalizer stages. FIG. 5 illustrates a configuration in which passive equalizer 200 is located in between active equalizer stages of the one or more active equalizer stages. Note that regardless of the location of passive equalizer 200 within linear equalizer stages 116, the resulting gain vs. frequency graph would be similar to graph 300 of FIG. 3. That is, regardless of the placement of passive equalizer 200, the higher gain is achieved at the desired frequency.

Therefore, by now it can be understood how an equalizer circuit with a negatively-resistive gain-boosting circuit and a resistive divider form a programmable unilateral voltage transfer-function equalization gain-slope and a resistive voltage-divider for DC gain. The gain-slope adjustment capability also allows for improved eye jitter in the output. This equalizer can be utilized with other active equalizers for both high- and low-frequency gain/gain-slope compensations. Furthermore, this equalizer consumes less power than an active equalizer would.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Also for example, in one embodiment, the illustrated elements of system 100 are circuitry located on a single integrated circuit or within a same device. Alternatively, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, fixed resistors may be used in place of variable resistors 206 and 212. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a passive equalizer includes a first input node; a first output node; a first resistive element coupled between the first input node and the first output node; a first capacitive element, a first variable resistor, and a first inductive element coupled in series between the first input node and the first output node; a first transistor having a first current electrode coupled to the first output node; and a first current source coupled to the first current electrode of the first transistor. In one aspect, the first current source includes a second transistor having a first current electrode coupled to a first voltage supply node, a second current electrode coupled to the first current electrode of the first transistor, and a control electrode coupled to receive a bias voltage. In a further aspect, the first transistor is an n-type transistor and the second transistor is a p-type transistor. In another further aspect, the first transistor has a second current electrode coupled to a second voltage supply node, wherein the first voltage supply node supplies a voltage that is greater than the second voltage supply node. In another aspect, the passive equalizer further includes a second input node; a second output node; a second transistor having a first current electrode coupled to the second output node and a control electrode coupled to the first output node, wherein the first transistor has a control electrode coupled to the second output node; and a second current source coupled to the first current electrode of the second transistor. In a further aspect, the passive equalizer further includes a second resistive element coupled between the second input node and the second output node; and a second capacitive element, a first variable resistor, and a first inductive element coupled in series between the second input node and the second output node. In another further aspect, the first current source includes a third transistor having a first current electrode coupled to a first voltage supply node, a second current electrode coupled to the first current electrode of the first transistor, and a control electrode coupled to receive a bias voltage, and the second current source includes a fourth transistor having a first current electrode coupled to the first voltage supply node, a second current electrode coupled to the first current electrode of the second transistor, and a control electrode coupled to receive the bias voltage. In yet a further aspect, the first transistor has a second current electrode coupled to a second voltage supply node and the second transistor has a second current electrode coupled to the second voltage supply node, and wherein the first voltage supply node supplies a voltage that is greater than the second voltage supply node. In another yet further aspect, the first and second transistors are n-type transistors and the third and fourth transistors are p-type transistors. In another aspect, a forward transfer function as seen from the first and second input nodes is different from a reverse transfer function as seen from the first and second output nodes. In another aspect, the passive equalizer further includes a third capacitive element coupled between the first output node and the second output node.

In another embodiment, a passive equalizer includes a first input node and a second input node; a first output node and a second output node; a first resistive element coupled between the first input node and the first output node; a first capacitive element, a first variable resistor, and a first inductive element coupled in series between the first input node and the first output node; a second resistive element coupled between the second input node and the second output node; and a second capacitive element, a first variable resistor, and a first inductive element coupled in series between the second input node and the second output node; a cross-coupled transistor pair coupled to the first and second output nodes. In one aspect, the cross-coupled transistor pair includes a first transistor having a first current electrode coupled to the first output node and a control electrode coupled to the second output node; and a second transistor having a first current electrode coupled to the second output node and a control electrode coupled to the first output node. In another aspect, the passive equalizer further includes a first current source coupled to the first current electrode of the first transistor; and a second current source coupled to the second current electrode of the second transistor. In another aspect, the first current source includes a third transistor having a first current electrode coupled to a first voltage supply node, a control electrode coupled to receive a bias voltage, and a second current electrode coupled to the first current electrode of the first transistor; and the second current source includes a fourth transistor having a first current electrode coupled to the first voltage supply node, a control electrode coupled to receive the bias voltage, and a second current electrode coupled to the first current electrode of the second transistor. In a further aspect, the first and second transistors are n-type transistors and the third and fourth transistors are p-type transistors. In another aspect, the passive equalizer further includes a third capacitive element coupled between the first output node and the second output node.

In another embodiment, a receiver includes an active equalizer; and a passive equalizer coupled to the first active equalizer, the passive equalizer having a first input node and a second input node; a first output node and a second output node; a first resistive element coupled between the first input node and the first output node; a first capacitive element, a first variable resistor, and a first inductive element coupled in series between the first input node and the first output node; a second resistive element coupled between the second input node and the second output node; and a second capacitive element, a first variable resistor, and a first inductive element coupled in series between the second input node and the second output node; and a cross-coupled transistor pair coupled to the first and second output nodes. In one aspect, an output of the active equalizer is coupled to the first and second input nodes of the passive equalizer. In another aspect, the first and second output nodes of the passive equalizer are coupled to an input of the active equalizer.

What is claimed is:

1. A passive equalizer comprising:
   a first input node;
   a first output node;
   a first resistive element coupled between the first input node and the first output node;
   a first capacitive element, a first variable resistor, and a first inductive element coupled in series between the first input node and the first output node;
   a first transistor having a first current electrode coupled to the first output node; and
   a first current source coupled to the first current electrode of the first transistor.

2. The passive equalizer of claim 1, wherein the first current source comprises a second transistor having a first current electrode coupled to a first voltage supply node, a second current electrode coupled to the first current electrode of the first transistor, and a control electrode coupled to receive a bias voltage.

3. The passive equalizer of claim 2 wherein the first transistor is an n-type transistor and the second transistor is a p-type transistor.

4. The passive equalizer of claim 2, wherein the first transistor has a second current electrode coupled to a second voltage supply node, wherein the first voltage supply node supplies a voltage that is greater than the second voltage supply node.

5. The passive equalizer of claim 1, further comprising:
   a second input node;
   a second output node;
   a second transistor having a first current electrode coupled to the second output node and a control electrode coupled to the first output node, wherein the first transistor has a control electrode coupled to the second output node; and
   a second current source coupled to the first current electrode of the second transistor.

6. The passive equalizer of claim 5, further comprising:
   a second resistive element coupled between the second input node and the second output node; and
   a second capacitive element, a second variable resistor, and a second inductive element coupled in series between the second input node and the second output node.

7. The passive equalizer of claim 5, wherein the first current source comprises a third transistor having a first current electrode coupled to a first voltage supply node, a second current electrode coupled to the first current electrode of the first transistor, and a control electrode coupled to receive a bias voltage, and the second current source comprises a fourth transistor having a first current electrode coupled to the first voltage supply node, a second current electrode coupled to the first current electrode of the second transistor, and a control electrode coupled to receive the bias voltage.

8. The passive equalizer of claim 7, wherein the first transistor has a second current electrode coupled to a second voltage supply node and the second transistor has a second current electrode coupled to the second voltage supply node, and wherein the first voltage supply node supplies a voltage that is greater than the second voltage supply node.

9. The passive equalizer of claim 7 wherein the first and second transistors are n-type transistors and the third and fourth transistors are p-type transistors.

10. The passive equalizer of claim 6, wherein a forward transfer function as seen from the first and second input nodes is different from a reverse transfer function as seen from the first and second output nodes.

11. The passive equalizer of claim 6, further comprising:
    a third capacitive element coupled between the first output node and the second output node.

12. A passive equalizer comprising:
    a first input node and a second input node;
    a first output node and a second output node;
    a first resistive element coupled between the first input node and the first output node;
    a first capacitive element, a first variable resistor, and a first inductive element coupled in series between the first input node and the first output node;
    a second resistive element coupled between the second input node and the second output node; and
    a second capacitive element, a second variable resistor, and a second inductive element coupled in series between the second input node and the second output node;
    a cross-coupled transistor pair coupled to the first and second output nodes.

13. The passive equalizer of claim 12, wherein the cross-coupled transistor pair comprises:
    a first transistor having a first current electrode coupled to the first output node and a control electrode coupled to the second output node; and
    a second transistor having a first current electrode coupled to the second output node and a control electrode coupled to the first output node.

14. The passive equalizer of claim 13, further comprising:
    a first current source coupled to the first current electrode of the first transistor; and
    a second current source coupled to the second current electrode of the second transistor.

15. The passive equalizer of claim 14, wherein:

the first current source comprises a third transistor having a first current electrode coupled to a first voltage supply node, a control electrode coupled to receive a bias voltage, and a second current electrode coupled to the first current electrode of the first transistor; and the second current source comprises a fourth transistor having a first current electrode coupled to the first voltage supply node, a control electrode coupled to receive the bias voltage, and a second current electrode coupled to the first current electrode of the second transistor.

16. The passive equalizer of claim 15, wherein the first and second transistors are n-type transistors and the third and fourth transistors are p-type transistors.

17. The passive equalizer of claim 12, further comprising a third capacitive element coupled between the first output node and the second output node.

18. A receiver, comprising:

an active equalizer; and a passive equalizer coupled to the first active equalizer, the passive equalizer comprising:

a first input node and a second input node;

a first output node and a second output node;

a first resistive element coupled between the first input node and the first output node;

a first capacitive element, a first variable resistor, and a first inductive element coupled in series between the first input node and the first output node;

a second resistive element coupled between the second input node and the second output node; and a second capacitive element, a second variable resistor, and a second inductive element coupled in series between the second input node and the second output node; and a cross-coupled transistor pair coupled to the first and second output nodes.

19. The receiver of claim 18, wherein an output of the active equalizer is coupled to the first and second input nodes of the passive equalizer.

20. The receiver of claim 18, wherein the first and second output nodes of the passive equalizer are coupled to an input of the active equalizer.

* * * * *